United States Patent
Suzuki et al.

(10) Patent No.: US 6,406,139 B1
(45) Date of Patent: Jun. 18, 2002

(54) INK, INK STORAGE AND RECORDING DEVICE

(75) Inventors: Shigeharu Suzuki; Mitsuo Ozaki; Shino Tokuyo, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/487,899

(22) Filed: Jan. 19, 2000

(30) Foreign Application Priority Data

Apr. 15, 1999 (JP) .......................................... 11-108532

(51) Int. Cl.$^7$ .............................................. G01D 11/00
(52) U.S. Cl. ........................................ 347/100; 347/101
(58) Field of Search ............................ 347/100, 101; 106/31.58, 31.6, 31.43

(56) References Cited

U.S. PATENT DOCUMENTS 5,658,376 A * 8/1997 Noguchi et al. ............. 347/100
5,835,116 A * 11/1998 Sato et al. ...................... 347/96
6,238,047 B1 * 5/2001 Suzuki et al. ................ 347/100

FOREIGN PATENT DOCUMENTS

| JP | 8-81647 | 3/1996 |
| JP | 8-285770 | 11/1996 |
| JP | 9-183224 | 7/1997 |

* cited by examiner

Primary Examiner—John Barlow
Assistant Examiner—M S Shah
(74) Attorney, Agent, or Firm—Armstrong, Westerman & Hattori, LLP (57) ABSTRACT

It is an exemplified object of the present invention to provide such ink that maintains dispersive and preservative stabilities suitable for inkjet ink, an ink storage storing the ink, and a recording device using the ink. The ink of the present invention is aqueous dispersoid ink comprising at least water, a water-soluble organic solvent and a colorant, and the composition thereof is as follows. A ratio R of Kt to Ko (=Kt/Ko) satisfies $R \leq 5$, where Ko (=Dm/Do) is a ratio of a maximum particle diameter Dm to an average particle diameter Do in said ink, both of which diameters are measured by detecting backscattering light and converting the detection result into a particle diameter under a dynamic light scattering method as a measurement principle. Kt (=Tm/To) is a ratio of a maximum particle diameter Tm to an average particle diameter To in the ink that has been preserved for six months at a constant temperature of 50° C., both of which diameters are measured by the principle and detection method.

13 Claims, 2 Drawing Sheets

INK, INK STORAGE AND RECORDING DEVICE

BACKGROUND OF THE INVENTION

The present invention relates generally to ink, and more particularly to printing ink for use with a recording device such as a printer.

The ink of the present invention is preferably applicable to a piezo-type inkjet head in which a piezoelectric element is used for a print head or a film-boiling-type (or bubble-type) inkjet head, and can widely be employed not only for a printer (inkjet printer) as a single unit, but also for a copier, a facsimile, a computer system, word-processor, or the combination thereof which has a printing function.

The inkjet printer is currently in increasing demand due to its excellence in noiseless operation and easiness to achieve a fall-color printing. In particular, the drop-on-demand inkjet head that ejects ink droplets from an inkjet nozzle only when necessary in printing operation has become widely used.

Among inkjet heads, those using a piezoelectric element (i.e. piezo-type inkjet head) have increasingly come into the limelight in recent years for their high energy-efficiency, etc. This kind of inkjet head typically includes a piezoelectric element, one common ink chamber which receives from an external device and stores ink, a plurality of pressure chambers connected to the piezoelectric element and a nozzle plate connected to the pressure chambers so that a nozzle may be connected to each pressure chamber. Each pressure chamber is connected to the common ink chamber through an ink supply channel so that it may receive ink from the common ink chamber and increase an internal pressure by utilizing a deformation of the piezoelectric element, thereby ejecting ink from each nozzle.

Other than the piezo-type inkjet head, those which eject ink droplets by using so-called bubble-type (film-boiling-type) ink ejecting means are known too.

Conventionally, the ink employed for this kind of inkjet recoding device is basically composed of a dye and a water-soluble organic solvent, but the dye has the intrinsic disadvantages of low water resistance and inferior lightfastness. Thus, to overcome such disadvantages, aqueous dispersoid ink (or pigment ink), which uses a pigment instead of a dye, has been developed. Compared with the dye ink, the aqueous dispersoid ink (or pigment ink) has a number of advantages in high water resistant lightfast property, high optical density on a recording medium, and less blurred property, etc.

The pigment ink, however, is disadvantageously difficult to keep a pigment particle stable because the pigment itself is insoluble in water or other solvents, and likely to clog in the nozzle. Accordingly, securing the ink dispersive stability has posed the most significant challenge in the pigment ink. Various proposals have been made to deal with this challenge, but prior art proposals have been found still insufficient.

For example, seeking to provide the dispersive and preservative stabilities to writing ink for use with a pen, etc. comprising a pigment, a dispersing agent, and an aqueous medium, Japanese Patent Publication (Kokai) No. 55-35434 has proposed to employ as a dispersing agent a polymer including as a main constituent alkyl ester of acrylic or methacrylic acid sharing both hydrophilic and lipophilic portions, and to employ an aqueous medium including a nonvolatile hydrophilic organic solvent, such as ethylene glycol.

However, writing ink is intrinsically unfit for ink used for such an inkjet recording device as ejects a droplet from a micro nozzle (hereinafter referred to as "inkjet ink"), and a long-term conservation thereof would evaporate water, increase its viscosity, and flocculate its particle; therefore such writing ink cannot be considered to secure the dispersive and preservative stabilities to such an extent as to be satisfactorily applicable to inkjet ink.

BRIEF SUMMARY OF THE INVENTION

Accordingly, it is an exemplified general object of the present invention to provide novel and useful ink, an ink storage such as an ink cartridge or tank, and a recording device using the ink in which the above disadvantages are eliminated.

More specifically, it is an exemplified object of the present invention to provide such ink that maintains the dispersive and preservative stabilities fit for inkjet ink, an ink storage, and a recording device using the ink.

The present inventors, after thorough study to achieve the above objects, have discovered that the previous disadvantages may be eliminated by instant novel dispersoid ink including a specific pigment, dispersing agent and/or additive in which a dispersed particle in the ink ranges in average diameter within a specific range when measured on a specific principle by a specific detection process.

Ink set forth in claim 1 comprises water and a water-soluble organic solvent, wherein a dispersed particle included in the ink further comprises a colorant including at least a carbon black, wherein the dispersed particle has a primary particle diameter of 30 nm or smaller, a BET specific surface area of 200 $m^2/g$ or smaller, a DBP oil absorption amount of 80 cc/100 g or smaller, a volatilization rate of 2.0% or higher, and a pH not greater than 7, and wherein the ink further comprises as a dispersing agent an acrylic macromolecule copolymer having weight average molecular weight of 80,000 or less. A relatively small primary particle, that is 30 nm or smaller in diameter, of the dispersed particle is selected so that it may hardly be precipitated. The dispersed particle if having the BET specific surface area of 200 $m^2/g$ or smaller would not be porous in general. The DBP oil absorption amount of 80 cc/100 g or smaller indicates the dispersed particle is relatively not so flocculated. The carbon black having a volatilization rate of 2.0% means that the dispersed particle has an oxidized film, etc. A pH not greater than 7 indicates that the dispersed particle is acidized. The present inventors have discovered that the ink satisfying these requirements is stable dispersoid ink. Moreover, the inventors have discovered that the ink further comprising as a dispersing agent an acrylic macromolecule copolymer having weight average molecular weight of 80,000 or less may gain further improved stability.

The ink set forth in claim 2 comprises water and a water-soluble organic solvent, wherein a dispersed particle included in the ink further comprises a colorant including at least a carbon black, wherein the dispersed particle has a primary particle diameter of 30 nm or smaller, a BET specific surface area of 200 $m^2/g$ or smaller, a DBP oil absorption amount of 80 cc/100 g or smaller, a volatilization rate of 2.0% or higher, and a pH not greater than 7, wherein the ink further comprises as a dispersing agent a polymer indispensably including hydrophilic, cationic and lipophilic components. The dispersed particle having a primary particle larger than 30 nm, a BET specific surface area larger than 200 $m^2/g$, a DBP oil absorption amount larger than 80 cc/100 g, a volatilization rate lower than 2.0%, and a pH greater than 7 would easily be flocculated and make its dispersion unstable. The present inventors have discovered that the ink further comprising as a dispersing agent a polymer indispensably including hydrophilic, cationic and lipophilic components in addition to these requirements may have further improved stability.

Because the carbon black carries negative charge, and, when the above dispersing agent is employed, the dispersing agent is adsorbed with its lipophilic component and adhered with its cationic component to a surface of the pigment, and the hydrophilic portion is dissolved in an aqueous medium. It is conceivable that a pigment particle is stably retained in the aqueous medium by the action of these three portions of the dispersing agent.

The ink set forth in claim 3 is aqueous dispersoid ink comprising at least water, a water-soluble organic solvent, and a colorant, wherein a ratio R of Kt to Ko (=Kt/Ko) satisfies $R \leq 5$ where Ko (=Dm/Do) is a ratio of a maximum particle diameter Dm to an average particle diameter Do in said ink, both of which diameters are measured by detecting backscattering light and converting a detection result into a particle diameter under a dynamic light scattering method as a measurement principle, and Kt (=Tm/To) is a ratio of a maximum particle diameter Tm to an average particle diameter To in said ink that has been preserved for six months at a constant temperature of 50° C., both of which diameters are measured by the above principle and detection method. If R amounted to five or more, a maximum-to-average particle diameter ratio (size) would be five times larger than that in its initial state, which indicates that the dispersed particle (particularly the maximum particle) in the ink would rapidly grow. In such ink, a dispersed particle would have a propensity to become flocculated for a long period over time, and also have an increasing possibility to be precipitated. There would be a good possibility that a disperse system of such ink would become unstable, and a preservative stability would be damaged.

According to the ink set forth in claim 4 that depends upon claim 3, an average particle diameter To of the dispersed particle included in the ink that has been preserved for six month at a constant temperature of 50° C. and then measured by applying the above principle and detection method ranges 10 nm$\leq$To$\leq$1,000 nm, and satisfies Do$\leq$To. The ink which satisfies 10 nm$\leq$To$\leq$1,000 nm and Do$\leq$To may provide a more stable disperse system compared with the ink claimed in claim 3. This is because To over 1,000 nm may produce a clog in the nozzle of the inkjet recording device, and considerably damage its reliability. In addition, it is practically impossible to consistently produce a particle having a diameter smaller than 10 nm. To is an average particle diameter after a change over time from an initial value, and is generally larger than the initial value Do.

According to the ink set forth in claim 5 that depends upon claim 3, a maximum particle diameter Tm of the dispersed particle included in the ink that has been preserved for six months at a constant temperature of 50° C. and then measured by applying the above principle and detection method ranges 10 nm$\leq$Tm$\leq$10,000 nm and satisfies Dm$\leq$Tm. The ink which satisfies 10 nm$\leq$Tm$\leq$10,000 nm and Dm$\leq$Tm may provide a more stable disperse system compared with the ink claimed in claim 3. This is because To over 1,000 nm may produce a clog in a nozzle of an inkjet recording device, and considerably damage its reliability. In addition, it is practically impossible to consistently produce a particle having a diameter smaller than 10 nm. To is an average particle diameter after a change over time from its initial value, and is generally larger than an initial value Do.

The ink set forth in claim 6 that depends upon claim 3 is filtrated with a filter whose pore size Df satisfies 1<Df/Dm$\leq$4. Df is the minimum pore size through which the particles may be filtrated in whole (pass by 100%). Taking it into consideration that a selection of the filter pore size based on a value measured by a particle analyzer may cause an unsuccessful filtration, the ink is limited to that which can pass through a filter with a specific range of pore size.

The ink set forth in claim 7 that depends upon claim 6 has a filter whose material is selected from a group consisting of cellulose acetate, cellulose nitrate, regenerated cellulose, polysulfone, polypropylene, and polyamide, and a combination thereof. The usable filter materials to ease the filtration of the ink may be hydrophilic ones.

According to the ink set forth in claim 8 that depends upon claim 3, the dispersed particle comprises a colorant including at least a carbon black, and has a primary particle diameter of 30 nm or smaller, a BET specific surface area of 200 $m^2$/g or smaller, a DBP oil absorption amount of 80 cc/100 g or smaller, a volatilization rate of 2.0% or higher, and a pH not greater than 7. Because the dispersed particle having a primary particle diameter larger than 30 nm, a BET specific surface area larger than 200 $m^2$/g, a DBP oil absorption amount larger than 80 cc/100 g, a volatilization rate lower than 2.0%, or a pH greater than 7 may easily be flocculated in the dispersoid ink, and destabilize the dispersion.

The ink set forth in claim 9 that depends upon claim 3 further comprises a dispersing agent. The dispersing agent may increase ink's dispersive stability.

The ink set forth in claim 10 that depends upon claim 9 may comprises a dispersing agent that is an acrylic macromolecule copolymer having a weight average molecular weight of 80,000 or less. The inventors have discovered that such ink is excellent in stability.

The ink set forth in claim 11 that depends upon claim 9 comprises a dispersing agent that is a polymer indispensably including hydrophilic, cationic and lipophilic components. Such ink is more excellent in stability than that claimed in claim 9. Because the carbon black carries negative charge in the aqueous solvent, and, when the above pigment is employed, the dispersing agent is adsorbed with its lipophilic component and adhered with its cationic component to a surface of the pigment, and the hydrophilic portion is dissolved in an aqueous medium. It is conceivable that a pigment particle is stably retained in the aqueous medium by the action of these three portions of the dispersing agent.

According to the ink set forth in claim 12 that depends upon claim 3, its viscosity η at 20° C. satisfies 1 cP$\leq$η$\leq$100 cP. The inventors have discovered that such ink is excellent in stability.

The claims 13 through 16 disclose the ink storage and the recording device that use the above ink. Since they use the ink that is excellent in dispersion and preservative stability, they provide a stable recording operation without clogs and high printing quality.

The ink set forth in claim 17 comprises at least water, a water-soluble organic solvent, and a colorant, wherein a ratio R of Kt to Ko (=Kt/Ko) satisfies R$\leq$5 where Ko (=Dm/Do) is a ratio of a maximum particle diameter Dm to an average particle diameter Do if the diameter of a dispersed particle included in the ink is measured directly, and Kt (=Tm/To) is a ratio of a maximum particle diameter Tm to an average particle diameter To if the diameter of a dispersed particle included in the ink that has been preserved for six months at a constant temperature of 50° C. and then measured.

Other objects and further features of the present invention will become readily apparent from the following description and accompanying drawings.

DETAILED DESCRIPTION OF THE INVENTION

According to ink of a first aspect of the present invention whose dispersive and preservative stabilities are improved, a dispersed particle in the aqueous dispersoid ink that is measured by detecting a backscattering light and converting the resultant detection into the particle diameter under the dynamic light scattering method (hereinafter abbreviated as "DLS method") as a measurement principle, and a maximum-to-average particle diameter ratio is obtained. Similarly, another maximum-to-average particle diameter ratio is obtained by applying the same principle and detection method from the ink that has been preserved for six months at a constant temperature of 50° C. Finally, a ratio of the former to the latter may be kept to be five or less. The dispersed particle in the present invention means a particle in such a state that a colorant or a dispersing agent is individual or complex.

For measuring a diameter of a particle dispersed in a solvent, optical or electrochemical methods are known in general. Among them, a particle analyzer (e.g., one utilizing a principle of photon correlation method) applying a measuring and detecting principle of an optical scattering (static/dynamic light scattering (DLS), etc.) has conventionally been used frequently but unable to measure without greatly diluting a sample. Thus, this conventional particle diameter method using the above measuring principle and detecting method has not been unable to measure the disperse state in the original liquid, and a dilution might probably change the disperse/flocculating state in the original liquid, entailing the risk of wrongly determining the particle diameter.

As opposed to this, recently, a particle analyzer (e.g., MICROTRAC particle analyzer) has been developed which irradiates a laser beam onto a particle dispersed in a solvent, analyzes a frequency by detecting a speed of the Doppler shift light scattered by the moving particle, and, based on this, determines a particle diameter. This device is characterized in determining a particle diameter by irradiating a laser beam onto a dispersed particle in a sample and measuring backscattering light of a laser reflection. This characteristic of the principle and method allows to measure a condensed sample which was previously impossible and to dispense with a great dilution of a sample.

On the other hand, the drawback of this principle and detection method is its high susceptibility to sample's viscosity. This is because a speed of the Doppler shift light caused by a dispersed particle is a function of temperature and viscosity, therefore is profoundly affected by a viscosity of a sample. Thus, a sample that gradually changed its viscosity or were of high viscosity would in principle discredit a validity of readout. Ink referred to in this invention, however, is a low-viscosity sample of 100 cP or less, or preferably of 30 cP or less, so that no problem arises with its measurement.

Thus, through a detection of the backscattering light and a conversion of the detection result into the particle diameter under the DLS method that appears to approximate the disperse/flocculating states of the aqueous dispersoid ink, which has conventionally been unavailable, the present invention has newly developed ink as it stands.

The present invention relates to aqueous dispersoid ink comprising at least water, a water-soluble organic solvent and a colorant, and provides ink characterized in that a ratio R of Kt to Ko (=Kt/Ko) satisfies R≦5, where Ko (=Dm/Do) is a ratio of a maximum particle diameter Dm (nm) to an average particle diameter Do (nm) in the ink, both of which diameters are measured by detecting backscattering light and converting a detection result into a particle diameter under a dynamic light scattering method as a measurement principle, and Kt (=Tm/To) is a ratio of a maximum particle diameter Tm (nm) to an average particle diameter To (nm) in the ink that has been preserved for six months at a constant temperature of 50° C., both of which diameters are measured by the above principle and detection method.

If R amounted to five or more, a maximum-to-average particle diameter ratio (size) would be five times larger than that in its initial state, which indicates that the dispersed particle (particularly the maximum particle) in the ink would rapidly grow. In such ink, a dispersed particle would have a propensity to become flocculated for a long period over time, and also have an increasing possibility to be precipitated. There would be a good possibility that a disperse system of such ink would become unstable, and a preservative stability would be damaged.

Preferably, the average particle diameter To of the dispersed particle included in the ink that has been preserved for six months at a constant temperature of 50° C. and measured by the above principle and detection method, when compared with the above Do, may range 10 nm≦To≦1,000 nm and Do≦To. This composition may provide ink having an improved stability of a disperse system.

This is because To of over 1,000 nm may produce a clog in the nozzle of the inkjet recording device, and considerably damage its reliability. In addition, it is practically impossible to consistently produce a particle having a diameter smaller than 10 nm. To is an average particle diameter after a change over time from an initial value, and is generally larger than the initial value Do.

Preferably, the maximum particle diameter Tm of the dispersed particle included in the ink that has been preserved for six months at a constant temperature of 50° C. and measured by the above principle and detection method, when compared with the above Dm, may range 10 nm≦Tm≦10,000 nm and Dm≦Tm. This composition may provide ink having an improved stability of a disperse system.

This is because Tm over 10,000 nm may produce a nozzle clog in the inkjet recording device, and considerably damage its reliability. In addition, it is practically impossible to consistently produce a particle having a diameter smaller than 10 nm. Tm is a maximum particle diameter after a change over time from an initial value, and is generally larger than the initial value Dm.

Further, the above ink may be filtrated with a filter; and, where a pore size is Df (nm), a ratio of the pore size to the above Dm may preferably range 1<Df/Dm≦4. This may provide ink having an improved stability of a disperse system.

This is because, conventionally, or presently too, a selection of the filter pore size based on a value measured by a particle analyzer may cause an unsuccessful filtration. It is probably due to the effect of varied shapes of an actual dispersed particle, which may not be simply spherical but extend in a chainlike fashion or have a branched shape inside the particle, or the like. Accordingly, a calculated particle diameter (its average or maximum value, etc.) considerably differs from the practical filter pore size; thus the ink in the present invention is characteristically that which has passed through a filter whose pore size is within a specific range.

The "pore size" in the present invention denotes a value measured by the bubble point method (a kind of pore size measurement) that is widely used for measuring a maximum filter pore size, or a value controlled through filter-retainability measurement by the indicator bacteria method (comprising the steps of actually filtrating specific bacteria (microorganisms) relative to a filter pore size, and controlling a pore size by its collection efficiency).

If Df were over four times larger than Dm, a pore size for filtration would be so large relative to a dispersed particle size that the large particle could pass through easily; therefore the filtration would count for nothing. Besides, if Df were not larger than Dm, the filtration would be impossible.

Furthermore, the above ink may be filtrated with a filter, and a filter material used for the filtration may preferably be composed of any of cellulose acetate, cellulose nitrate, regenerated cellulose, polysulfone, polypropylene, and polyamide, or a combination thereof. This may provide ink having an improved stability of a disperse system.

This is because, when the above ink is filtrated, a selection of the filter material as well as the filter pore size may cause an unsuccessful filtration. It is probably due to the effect of low wettability of the filter material with dispersoid ink (or a specific chemical in its composition, etc.). Accordingly, whether or not the filtration succeeds may depend on the selection of the filter material; thus the ink in the present invention is characteristically that which has passed through a filter composed of a specific material.

Preferably, the dispersed particle in the ink may comprise a colorant including at least a carbon black, and have the following properties: a primary particle diameter of 30 nm or smaller, a BET specific surface area of 200 $m^2/g$ or smaller, a DBP oil absorption amount of 80 cc/100 g or smaller, a volatilization rate of 2.0% or higher, and a pH not greater than 7. This may provide stable dispersoid ink.

This is because the above dispersed particle having a primary particle larger than 30 nm, a BET specific surface area larger than 200 $m^2/g$, a DBP oil absorption amount larger than 80 cc/100g, a volatilization rate higher than 2.0%, or a pH greater than 7 may easily be flocculated in the dispersoid ink, and destabilize the dispersion.

The above-said dispersed particle that can be used other than the carbon black may include a yellow pigment such as insoluble azo, isoindorinone, benzimidazolone, and condensed azo, or a red pigment such as insoluble azo, quinacridone, perylene, and zioxazine, or a blue pigment such as phthalocyanine, and indanthrene.

Moreover, the above ink, if further includes a dispersing agent composed of an acrylic macromolecule copolymer not more than 80,000 in average molecular weight, may gain further increased stability.

This is because the macromolecule copolymer having an average molecular weight more than 80,000 added by 100 wt % or more of the pigment would lower the water-solubility of the dispersing agent, increase the viscosity of the ink, and become likely to cause a poor printing quality when the inkjet recording device ejects the ink. On the other hand, the macromolecule copolymer added by 10 wt % or less of the pigment would destabilize the dispersion of the pigment.

Consequently, the average molecular weight of the macromolecule copolymer in the dispersing agent should range preferably 80,000 or less, further preferably 3,000 to 60,000. The macromolecule copolymer should also be added preferably by 10 to 100 wt %, further preferably by 10 to 30 wt % of the pigment.

The acrylic macromolecule dispersing agent that fulfills the above requirements should preferably be composed of an alkaline soluble water-soluble resin. For example, a styrene-acrylic acid copolymer, an acrylic acid-acrylic acid alkyl ester copolymer, a styrene-acrylic acid-acrylic acid alkyl ester copolymer, a styrene-methacrylic acid-acrylic acid alkyl ester copolymer, a styrene-α-methylstyrene-acrylic acid copolymer, a styrene-α-methylstyrene-acrylic acid-acrylic acid copolymer, and salts thereof, a polyacrylate, a polymethacrylate, a vinylnaphthalene-acrylic acid copolymer salt, a styrene-maleic acid copolymer, a maleic acid-maleic anhydride copolymer salt, a vinylnaphthalene-maleic acid copolymer salt, etc. may be used. They may be added either singly or in the form of a mixture of two or more of them.

In addition, if the above dispersing agent is a polymer indispensably including hydrophilic, cationic and lipophilic components, the ink ensures excellent dispersive stability. Because the above pigment (e.g., carbon black, etc.) carries negative charge, and, when the above pigment is employed, the dispersing agent is adsorbed with its lipophilic component and adhered with its cationic component to a surface of the pigment, and the hydrophilic portion is dissolved in an aqueous medium. It is conceivable that a pigment particle is stably retained in the aqueous medium by the action of these three portions of the dispersing agent.

The above-said dispersing agent may include as its lipophilic component an α,β-ethylene series unsaturated carboxylic acid alkyl ester, a cycloalkyl ester, an aryl ester, and an arylalkyl ester each including an acrylic acid, a methacrylic acid, an itaconic acid, and a fumalic acid, styrene, α-methylstyrene, and a polymer composed of a mixture thereof, as its cationic component a primary, secondary, and tertiary amine, a quaternary ammonium, pyridinium, and a copolymer composed of a mixture thereof, and as its hydrophilic portion (a) an anionic salt such as a carboxyl group, a sulfonic acid group, a sulfate group, a phosphate group, etc., (b) a cationic salt composed of cation, and (c) a nonionic group such as a hydroxyl group, an ethylene oxide addition, a carbamid group, etc., or a polymer composed of a mixture thereof.

In order to solubilize the dispersing agent, it may be possible to add an organic or inorganic base such as monoethanolamine, diethanolamine, triethanolamine, aminomethylpropanol, ammonia, etc.

The water-soluble organic solvent usable for the above ink may include lower alkyl ether of: monohydric alcohol such as methanol, ethanol, (normal) propyl alcohol, and isopropyl alcohol, etc., dihydric alcohol such as ethylene glycol, propylene glycol, butylene glycol, hexylene glycol, diethylene glycol, and triethylene glycol, etc., trihydric alcohol such as glycerin, trimethylolpropane, and 1,2,3-trimethylolpropane, etc., tetrahydric alcohol or alcohol having a hydroxy group of more than four such as pentaerythritol, etc., polyhydric alcohol such as polyalkyllene glycol e.g., polyethylene glycol and polybutylene glycol, ethylene glycol monomethyl ether, diethylene glycol monomethyl ether, and triethylene glycol monomethyl ether, etc. Among them, polyhydric alcohol such as diethylene glycol is preferable. These water-soluble organic solvents may be used in the form of a mixture of them, and preferably make up 1 to 20% by weight of the ink.

The ink of the present invention may, as necessary, include an additive such as a surfactant, a pH regulator (buffer), a rust preventive, a preservative, an antifungal agent, an antioxidant, a drier, a penetrant, and a chelating agent.

As a pigment dispersion method, various kinds of method conventionally employed for dispersing a pigment may be applied. Thus, the ink of the present invention can be obtained by dispersing the pigment with a commercially available dispersing apparatus such as a ball mill, a sand mill, the Atritor, a roll mill, a bead mill, a colloid mill, an ultrasonic homogenizer, and a high-pressure homogenizer.

Furthermore, the viscosity $\eta$ (cP) at 20° C. of the above ink preferably ranges $1 \leq \eta \leq 100$. This may provide ink whose disperse system is stable. For $\eta$ exceeding 100 may require vast energy for ink ejection of the inkjet recording device, and may produce a clog in the nozzle of the inkjet recording device, and considerably damage its reliability. Preferably 30 or less, further preferably 10 or less, of $\eta$ may be effective in securing its energy-efficiency and reliability. On the other hand, it is practically impossible to consistently produce aqueous ink having $\eta$ smaller than 1.

A description will now be given of an inkjet printer the inventive ink is applied to with reference to FIGS. 1 to 3 inclusive. In each drawing, those elements designated by the same reference numeral denote the same elements, and a duplicate description thereof will be omitted. Those elements designated by the same reference numeral with a variety of alphabetical letters attached thereto denote the same kinds of elements but are distinguished from each other by alphabets and are comprehensively designated by simple reference numerals.

Figure 1:
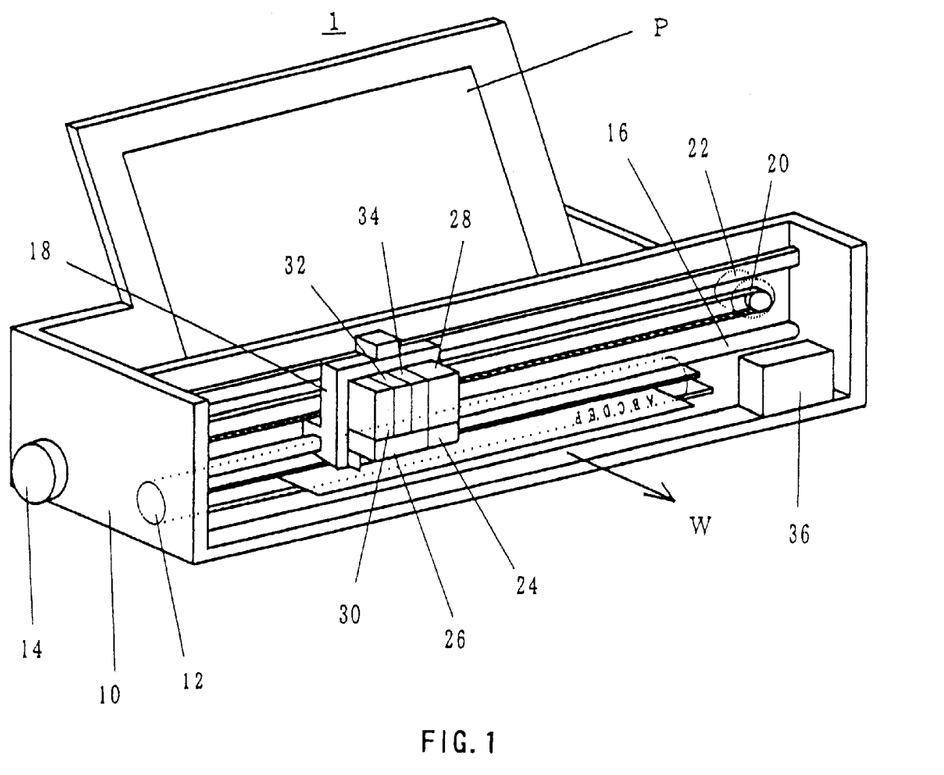
FIG. 1 is a schematic perspective view of an inkjet printer to which an inkjet head of the present invention is applicable.

FIG. 1 schematically illustrates an embodiment of a color inkjet printer (recording device) 1 to which the ink of the present invention is applied, as will be specifically described later. A platen 12 is rotatably provided in a housing 10 of the recording device 1.

During a recording operation, the platen 12 is driven and intermittently rotated by a drive motor; thereby, a piece of recording paper P is fed intermittently at a predetermined feed pitch in arrow direction W. The housing 10 of the recording device 1 also includes a guide rod 16 above and parallel to the platen 12, and a carriage 18 is slidably attached onto the guide rod 16.

The carriage 18 is attached to an endless drive belt 20, which is driven by the drive motor 22, whereby the carriage 18 is reciprocated (scanned) along the platen 12.

The carriage 18 is mounted with a recording head 24 for a black color and a recording head 26 for multiple colors. The recording head 26 for multiple colors may be comprised of three parts. The recording head 24 for a black color is detachably mounted with a black ink cartridge 28, while the recording head 26 for multiple colors is detachably mounted with color ink cartridges 30, 32 and 34.

The black ink cartridge 28 stores black ink of the present invention, whereas the color ink cartridges 30, 32 and 34 respectively store yellow ink, cyan ink and magenta ink of the present invention. Due to the black ink's higher frequency of use than the other ink, the black ink cartridge 28 accommodates more ink than the other ink cartridges.

Figure 2:
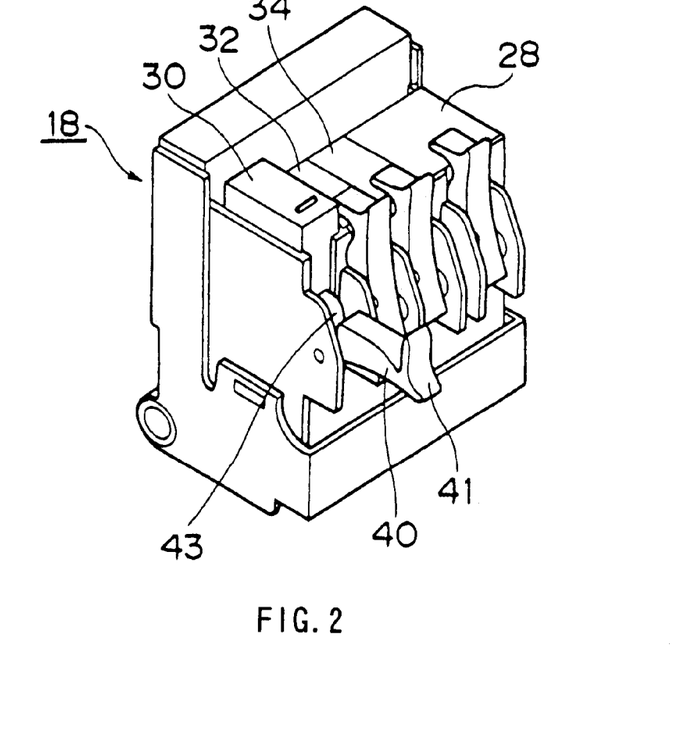
FIG. 2 is a schematic enlarged perspective view of an ink cartridge portion applicable to the inkjet printer shown in FIG. 1.
Figure 3:
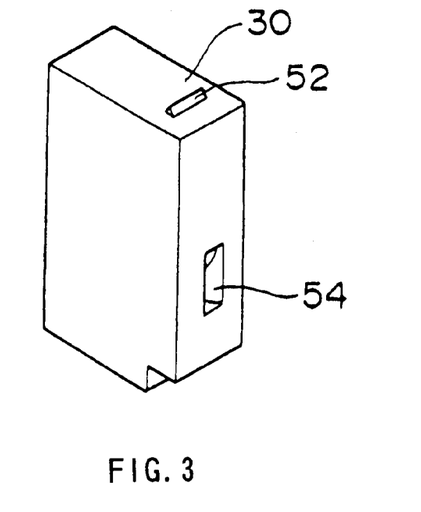
FIG. 3 is a schematic enlarged perspective view of the ink cartridge shown in FIG. 2.

FIG. 2 is a schematic enlarged perspective view of each ink cartridge shown in FIG. 1, and FIG. 3 is a schematic enlarged perspective view of the ink cartridge 30. The ink cartridge 30 comprises an engagement portion 52 engaged with a claw 41 of a lever 40 and a hole 54 engaged with a projection 43. The cartridge has at the bottom a hole (ink supplying portion, not shown) connected to the head corresponding to the cartridge, and contains a sponge saturated with ink or an aluminum pack filled with ink.

While the carriage 18 reciprocates along the platen 12, the recording head 24 for a black color and the recording head 26 for multiple colors are driven based upon image data obtained from a word-processor, a personal computer, etc., thereby recording given characters, images, etc. on the printing paper P. When the recording operation ends, the carriage 18 returns to a home position, where a nozzle maintenance mechanism (backup unit) 36 is provided.

The nozzle maintenance mechanism 36 includes a movable suction cap (not shown) and a suction pump (not shown) connected to this movable suction cap. When the recording heads 24 and 26 are placed at the home position, the suction cap is adsorbed to a nozzle plate of each recording head, and the suction pump is driven and thereby sucks nozzles of the nozzle plate. This mechanism prevents the nozzle from being clogged.

The present invention will now be explained in detail with reference to examples and comparative examples of the present invention.

EXAMPLE 1

(a) Preparation of a Condensed Pigment Disperse Liquid
  Acrylic macromolecule copolymer: 8.3 wt %
    (Styrene-maleic acid, weight average molecular weight of 20,000, nonvolatilization rate of 30%)
  Ion exchange water: 80.5 wt %

The above materials were mixed, and then agitated, into an aqueous solution, to which a carbon black (a primary particle of 24 nm, a BET specific surface area of 138 $m^2/g$, a DBP oil absorption amount of 60 cc/100 g, a volatilization rate of 4.5%, a pH of 2.5) of 10 wt %, a defoamer of 1.2 wt % were added, and dispersed for an hour by a bead mill dispersing agent, and large particles are eliminated by a centrifuge, whereby a condensed pigment disperse liquid was obtained.

(b) Preparation of an Aqueous Recording Liquid
  Condensed pigment disperse liquid: 18 wt %
  Diethylene glycol: 2.2 wt %
  Ion exchange water: 9.8 wt %

The above materials were mixed and agitated, and then filtrated with a filter made of cellulose acetate having a pore size of 0.8 $\mu$m, whereby the objective aqueous recording liquid was obtained.

EXAMPLE 2

In (a) Preparation of a condensed pigment disperse liquid, each amount was changed as follows:
  Acrylic macromolecule copolymer: 9.0 wt %
    (Styrene-maleic acid, weight average molecular weight of 20,000, nonvolatilization rate of 30%)
  Ion exchange water: 76.7 wt %
  Carbon black added: 13 wt %
  Defoamer: 1 wt %

With the above material composition, and through a process of dispersion and centrifuge as EXAMPLE 1, the condensed pigment disperse liquid was obtained. Subsequently mixed are:

Condensed pigment disperse liquid: 90 wt %
Pentaerythritol: 11 wt %
Ion exchange water: 48.7 wt %
The above materials were mixed and agitated, and then filtrated with a filter made of polyamide having a pore size of 1 μm, whereby the objective aqueous recording liquid was obtained.

EXAMPLE 3

In (a) Preparation of a condensed pigment disperse liquid, each amount was changed as follows:
Acrylic macromolecule copolymer: 10 wt %
Ion exchange water: 76.5 wt %
Carbon black added: 12 wt %
Defoamer: 1.5 wt %
With the above material composition, and through a process of dispersion and centrifuge as EXAMPLE 1, the condensed pigment disperse liquid was obtained. Subsequently mixed are:
Condensed pigment disperse liquid: 90 wt %
Trimethylol propane: 11 wt %
Ion exchange water: 48.7 wt %
The above materials were mixed and agitated, and then filtrated with a filter made of cellulose nitrate having a pore size of 0.8 μm, whereby the objective aqueous recording liquid was obtained.

EXAMPLE 4

In (a) Preparation of a condensed pigment disperse liquid, each amount was changed as follows:
Acrylic macromolecule copolymer: 5.4 wt %
Ion exchange water: 87.3 wt %
Carbon black added: 6.5 wt %
Defoamer: 0.8 wt %
With the above material composition, and through a process of dispersion and centrifuge as EXAMPLE 1, the condensed pigment disperse liquid was obtained. Subsequently mixed are:
Condensed pigment disperse liquid: 90 wt %
Glycerin: 11 wt %
Ion exchange water: 48.7 wt %
The above materials were mixed and agitated, and then filtrated with a filter made of regenerated cellulose having a pore size of 0.8 μm, whereby the objective aqueous recording liquid was obtained.

EXAMPLE 5

In (a) Preparation of a condensed pigment disperse liquid, each amount was changed as follows:
Acrylic macromolecule copolymer: 9.0 wt %
Ion exchange water: 76.7 wt %
Carbon black added: 13 wt %
Defoamer: 1 wt %
With the above material composition, and through a process of dispersion and centrifuge as EXAMPLE 1, the condensed pigment disperse liquid was obtained. Subsequently mixed are:
Condensed pigment disperse liquid: 90 wt %
Glycerin: 11 wt %
Ion exchange water: 48.7 wt %
The above materials were mixed and agitated, and then filtrated with a filter made of polysulfone having a pore size of 3 μm, whereby the objective aqueous recording liquid was obtained.

EXAMPLE 6

In (a) Preparation of a condensed pigment disperse liquid, each amount was changed as follows:
Acrylic macromolecule copolymer: 9.0 wt %
Ion exchange water: 76.7 wt %
Carbon black added: 13 wt %
Defoamer: 1 wt %
With the above material composition, and through a process of dispersion and centrifuge as EXAMPLE 1, the condensed pigment disperse liquid was obtained. Subsequently mixed are:
Condensed pigment disperse liquid: 90 wt %
Propylene glycol: 11 wt %
Ion exchange water: 48.7 wt %
The above materials were mixed and agitated, and then filtrated with a filter made of polypropylene having a pore size of 5 μm, whereby the objective aqueous recording liquid was obtained.

Comparative Example 1

Instead of the acrylic macromolecule copolymer in EXAMPLE 1, SANSPAR PDN 173 (Sanyo Chemical Industries, Ltd., polycarbonic acid special macromolecule copolymer) was used, and except for this, the same composition and manufacturing process were applied as in EXAMPLE 1. Subsequently, the mixed and agitated materials were filtrated with a filter made of polytetrafluoroethyrene having a pore size of 5 μm, whereby ink was obtained.

Comparative Example 2

Instead of the acrylic macromolecule copolymer in EXAMPLE 1, NONION NS-210 (NOF Corporation, nonionic) was used, and except for this, the same composition and manufacturing process were applied as in EXAMPLE 1, whereby ink was obtained.

Comparative Example 3

Instead of the acrylic macromolecule copolymer in EXAMPLE 1, SANSIZER SA501-20 (Sanyo Chemical Industries, Ltd., acrylic macromolecule copolymer, weight average molecular weight of 100,000, nonvolatilization rate of 20%) was used, and except for this, the same composition and manufacturing process were applied as in EXAMPLE 1, whereby ink was obtained.

With respect to the forgoing aqueous recording liquids, an average diameter Do (nm) and a maximum diameter Dm (nm) of a dispersed particle included in the ink were measured by detecting backscattering light and converting the detection result into a particle diameter under a dynamic light scattering method as a measurement principle with a particle analyzer MICROTRAC-UPA (a trade name, Nikkiso Co., Ltd.), and an average diameter To (nm) and a maximum diameter Tm (nm) of a dispersed particle included in the ink that had been preserved for six months at a constant temperature of 50° C. and were measured by applying the same principle/detecting method, whereby Ko (=Dm/Do), Kt (=Tm/To), and R (=Kt/Ko) were calculated.

The value R and evaluations of the above aqueous recording liquids before and after the preservation in terms of dispersivity, ejection stability, and printing quality are shown in TABLE 1.

The printing quality and dispersive stability of the ink were measured and evaluated with an ink-on-demand inkjet recording device (nozzle diameter: ö 40 ì m, the number of nozzles: 24). As a recording medium, a normal paper XEROX4020 was employed. Each test was conducted on a recorded image formed by the ink, and the result is shown in TABLE 1.

The dispersive stability was evaluated by measuring a particle size before and after two-year preservation at a constant room temperature, so that the ink increased in average particle diameter by 30% or less was indicated with ○, over 30% through 50% with Δ, and 50% or more with ×.

The ejection stability was evaluated by measuring the number of pieces of paper printed without a dot dropout when the ink was continuously ejected by the inkjet recording device, so that the ink capable of continuously printing 10 pieces or more of paper was indicated with ○, 5 to 10 pieces with Δ, and less than 5 pieces with ×.

The printing quality was evaluated in the density of recorded image, which was measured with a spectrocolorimeter (e.g., made by X-Rite Incorporated) and evaluated from the value of optical reflection density or OD (optical density), so that the ink having the optical reflection density or OD of 1.0 or higher was indicated with ○, 0.5 to 1.0 with Δ, and less than 0.5 with ×.

(=Tm/To) is a ratio of a maximum particle diameter Tm to an average particle diameter To in said ink that has been preserved for six months at a constant temperature of 50° C., both of which diameters are measured by said principle and detection method.

2. The ink according to claim 1, wherein the average particle diameter To of said dispersed particle in said ink that has been preserved for six months at a constant temperature of 50° C. and then measured by applying said principle and detection method ranges 10 nm≦To≦1,000 nm, and satisfies Do≦To.

3. The ink according to claim 1, wherein the maximum particle diameter Tm of said dispersed particle in said ink that has been preserved for six months at a constant temperature of 50° C. and then measured by applying said principle and detection method ranges 10 nm≦Tm≦10,000 nm and satisfies Dm≦Tm.

4. The ink according to claim 1, wherein said ink is filtrated with a filter whose pore size Df satisfies 1<Df/Dm≦4.

5. The ink according to claim 4, wherein a material of said filter is selected from a group consisting of cellulose acetate, cellulose nitrate, regenerated cellulose, polysulfone, polypropylene, and polyamide, and a combination thereof.

6. The ink according to claim 1, wherein a dispersed particle included in said ink comprises a colorant including at least a carbon black, and

TABLE 1

| | Do (nm) | Dm (nm) | To (nm) | Tm (nm) | R | Df | Df/Dm | DISPERS-IVITY | EJECTION STABILITY | PRINTNG QUALITY |
|---|---|---|---|---|---|---|---|---|---|---|
| EXAMPLE 1 | 80 | 200 | 90 | 300 | 1.33 | 800 | 4 | ○ | ○ | ○ |
| EXAMPLE 2 | 80 | 300 | 100 | 400 | 1.07 | 1,000 | 3.33 | ○ | ○ | ○ |
| EXAMPLE 3 | 90 | 200 | 90 | 300 | 1.5 | 800 | 4 | ○ | ○ | ○ |
| EXAMPLE 4 | 90 | 300 | 100 | 300 | 0.9 | 800 | 2.67 | ○ | ○ | ○ |
| EXAMPLE 5 | 300 | 900 | 500 | 1,500 | 1 | 3,000 | 3.33 | ○ | ○ | ○ |
| EXAMPLE 6 | 700 | 2,000 | 1,000 | 3,000 | 1.05 | 5,000 | 2.5 | ○ | ○ | ○ |
| COMPARATIVE EXAMPLE 1 | 100 | 300 | 200 | 3,500 | 5.83 | 5,000 | 16.67 | Δ | X | Δ |
| COMPARATIVE EXAMPLE 2 | 300 | 900 | 500 | 8,000 | 5.33 | 10,000 | 11.11 | X | Δ | Δ |
| COMPARATIVE EXAMPLE 3 | 1,000 | 5,000 | 1,500 | 38,000 | 5.07 | 50,000 | 10 | X | X | X |

Consequently, ink preparations illustrated in EXAMPLEs 1–6 could result in obtaining good aqueous dispersoid ink having excellent dispersive stability, ejection stability and printing property.

While the present invention has been described above in its preferred embodiments, various changes and modifications may be made without departing from the spirit and scope of the present invention.

According to the present invention, ink that is excellent in dispersion and preservative stabilities, and ejection stability when ejecting from the recording device can be provided. Therefore, the inventive ink cartridge can store ink for a longer period than was previously possible. Furthermore, the recording device employing the ink of the present invention can realize high printing quality and stable operation hardly causing a nozzle clog, etc.

What is claimed is:

1. Aqueous dispersoid ink comprising at least water, a water-soluble organic solvent and a colorant, wherein a ratio R of Kt to Ko (=Kt/Ko) satisfies R≦5, where Ko (=Dm/Do) is a ratio of a maximum particle diameter Dm to an average particle diameter Do in said ink, both of which diameters are measured by detecting backscattering light and converting a detection result into a particle diameter under a dynamic light scattering method as a measurement principle, and Kt wherein said dispersed particle has a primary particle diameter of 30 nm or smaller, a BET specific surface area of 200 m$^2$/g or lower, a DBP oil absorption amount of 80 cc/100 g or smaller, a volatilization rate of 2.0% or higher, and a pH not greater than 7.

7. The ink according to claim 1, further comprising a dispersing agent.

8. The ink according to claim 7, wherein said dispersing agent is an acrylic macromolecule copolymer having a weight average molecular weight of 80,000 or less.

9. The ink according to claim 7, wherein said dispersing agent is a polymer indispensably including hydrophilic, cationic and lipophilic components.

10. The ink according to claim 1, wherein a viscosity η at 20° C. satisfies 1 cP≦η≦100 cP.

11. An ink storage comprising:
a housing; and
ink stored in said housing, said ink comprising aqueous dispersoid ink comprising at least water, a water-soluble organic solvent and a colorant, wherein a ratio R of Kt to Ko (=Kt/Ko) satisfies R≦5, where Ko (=Dm/Do) is a ratio of a maximum particle diameter Dm to an average particle diameter Do in said ink, both of which diameters are measured by detecting backscattering light and converting a detection result into a particle diameter under a dynamic light scattering method as a measurement principle, and Kt (=Tm/To) is a ratio of a maximum particle diameter Tm to an average particle diameter To in said ink that has been preserved for six months at a constant temperature of 50° C., both of which diameters are measured by said principle and detection method.

12. A recording device including:

a head; and an ink storage supplying ink to said head, wherein said ink is aqueous dispersoid ink comprising at least water, a water-soluble organic solvent, and a colorant, wherein a ratio R of Kt to Ko (=Kt/Ko) satisfies R≦5, where Ko (=Dm/Do) is a ratio of a maximum particle diameter Dm to an average particle diameter Do in said ink, both of which diameters are measured by detecting backscattering light and converting a detection result into a particle diameter under a dynamic light scattering method as a measurement principle, and Kt (=Tm/To) is a ratio of a maximum particle diameter Tm to an average particle diameter To in said ink that has been preserved for six months at a constant temperature of 50° C., both of which diameters are measured by said principle and detection method.

13. Ink comprising at least water, a water-soluble organic solvent, and a colorant, wherein a ratio R of Kt to Ko (=Kt/Ko) satisfies R≦5, where Ko (=Dm/Do) is a ratio of a maximum particle diameter Dm to an average particle diameter Do when a diameter of a dispersed particle included in said ink is measured by measuring backscattering light of a laser directed through a sample, and Kt (=Tm/To) is a ratio of a maximum particle diameter Tm to an average particle diameter To when a diameter of said dispersed particle included in said ink that has been preserved for six months at a constant temperature of 50° C. and then measured by measuring backscattering light of a laser directed through a sample.

* * * * *